(12) United States Patent
Iyama (10) Patent No.: US 7,697,220 B2
(45) Date of Patent: Apr. 13, 2010

(54) IMAGE FORMING OPTICAL SYSTEM

(75) Inventor: Noriyuki Iyama, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 0 days.

(21) Appl. No.: 12/313,648

(22) Filed: Nov. 21, 2008

(65) Prior Publication Data
US 2009/0141368 A1      Jun. 4, 2009

(30) Foreign Application Priority Data
Nov. 30, 2007    (JP)    ............... 2007-311441

(51) Int. Cl.
*G02B 13/04*  (2006.01)
*G02B 9/60*   (2006.01)
(52) U.S. Cl. ....................... 359/753; 359/770
(58) Field of Classification Search ................ 359/691, 359/763, 770, 714, 753, 682
See application file for complete search history.

(56) References Cited
FOREIGN PATENT DOCUMENTS

| JP | 2006-201674 | 8/2006 |
|---|---|---|
| JP | 2006-220691 | 8/2006 |
| JP | 2006-243092 | 9/2006 |
| JP | 2006-301222 | 11/2006 |

*Primary Examiner*—Alicia M Harrington
(74) *Attorney, Agent, or Firm*—Kenyon & Kenyon LLP (57) ABSTRACT

An image forming optical system comprises, in order from an object side, a front lens group having negative refracting power, and a rear lens group having positive refracting power, wherein said front group comprises, in order from the object side, a first lens element having the negative refracting power, and a second lens element of a meniscus form having a convex surface directed toward an image side; wherein said first lens element has an aspherical surface that is a concave surface directed toward the object side in the vicinity of the optical axis, and negative refracting power at a position on the aspherical surface becomes weak as a distance between the position and the optical axis becomes large, and a surface directed toward the image side that is concave at least in the vicinity of the optical axis; and further the following conditions (1) and (2) are satisfied:

$$1.0 < |f_{G1}|/F_A < 10 \qquad (1)$$

$$1.0 < f_{G2}/F_A < 10 \qquad (2)$$

where $F_A$ is a focal length of the whole optical system, $f_{G1}$ is a focal length of said front group, and $f_{G2}$ is a focal length of said rear group.

11 Claims, 8 Drawing Sheets

EMBODIMENT 1

FIG.1

EMBODIMENT 1

FIG.2

EMBODIMENT 1

FIG. 3A SPHERICAL ABERRATION FNO 2.80

FIG. 3B ASTIGMATISM ω 66.50

FIG. 3C DISTORTION ω 66.50

FIG. 3D CHROMATIC ABERRATION OF MAGNIFICATION ω 66.50

435.84 nm
486.13 nm
656.27 nm
587.56 nm

EMBODIMENT 1

FIG. 4

EMBODIMENT 2

FIG. 5

EMBODIMENT 2

FIG.7
EMBODIMENT 3

FIG.8
EMBODIMENT 3

FIG.9A SPHERICAL ABERRATION FNO 2.80

FIG.9B ASTIGMATISM ω 65.50

FIG.9C DISTORTION ω 65.50

FIG.9D CHROMATIC ABERRATION OF MAGNIFICATION ω 65.50

435.84 nm
486.13 nm
656.27 nm
587.56 nm

EMBODIMENT 3

FIG.10
EMBODIMENT 4

FIG.11
EMBODIMENT 4

IMAGE FORMING OPTICAL SYSTEM

This application claims benefits of Japanese Patent Application No. 2007-311441 filed in Japan on Nov. 30, 2007, the contents of which are hereby incorporated by reference.

BACKGROUND OF THE INVENTION

1. Field of the Invention

The present invention relates to an image forming optical system suitable for imaging apparatus using solid-state image sensing devices, such as CCD (Charge Coupled Device) and CMOS (Complementary Metal-Oxide Semiconductor), etc.

2. Description of the Related Art

In recent years, motorcar equipped with a camera for vehicle that is mounted on vehicle has been widely used. The camera for vehicle was used only for observation by eyes in a monitor at the beginning stage. However, recently, it has been increasingly used also as camera for much advanced sensor, for detection of a white line, detection of deviation from traffic lane, detection of an obstacle, detection of a state of practice in swinging a golf driver, etc.

As for an image forming optical system used for such camera mounted on vehicle, it has been demanded that an image forming optical system has a large angle of view, concretely, diagonal angle of view is about 130 degrees or more, and high image quality, and further it is compact with a small number of sheets of lens, and can be produced by low cost, in order that a dead angle is made small as much as possible.

As the image forming optical system used for the camera for vehicle, a system in which a distortion generated is small has been demanded. In the optical system in which a large negative distortion is generated although it has a large angle of view as seen in an optical system using a fish-eye lens for example, there is a case that exact information on a circumference portion cannot be obtained since an image size of the circumference portion is very small compared with that of the central portion of the obtained image. Furthermore, there is a case that a shape of the image of an object that is actually observed with the naked eye may differ very much from that of an object image that is observed through a monitor since an image of a linear object is formed as a bent shape at the circumference portion.

Under such circumstances, examples of conventional image forming optical system in which an angle of view is comparatively large, and a distortion is corrected to some extent, and the number of sheets of lens is small have been shown in Publications of the Japanese unexamined patent application Toku Kai No. 2006-201674, Patent No. 2006-220691, Patent No. 2006-243092, and Patent No. 2006-301222.

SUMMARY OF THE INVENTION

The image forming optical system according to the present invention is characterized in that in an image forming optical system comprising a front lens group having negative refracting power, and a rear lens group having positive refracting power, which are arranged in order from an object side, the front group has a first lens element having negative refracting power and a second lens element of a meniscus form having a convex surface directed toward the image side, which are arranged in order from the object side, wherein the first lens has aspherical surfaces such that a surface directed toward the object side is concave in the vicinity of the optical axis, and a surface directed toward the image side that is concave at least in the vicinity of the optical axis, and further the aspherical surfaces have negative refracting power that the refracting power at a position on the surface decreases as a distance between the position on the surface and the optical axis increases; and the following conditions (1) and (2) are satisfied:

$$1.0 < |f_{G1}|/F_A < 10 \tag{1}$$

$$1.0 < f_{G2}/F_A < 10 \tag{2}$$

where $F_A$ is a focal length of the whole optical system, $f_{G1}$ is a focal length of the front group, and $f_{G2}$ is a focal length of the rear group.

In the image forming optical system of the present invention, it is desired that the rear group comprises at least two sheets of positive lens element and an aperture stop, and a lens at the utmost image side in the rear group has aspherical surfaces, wherein a surface directed toward the object side is a convex at least in the vicinity of the optical axis, and a surface directed toward the image side that is a convex in the vicinity of the optical axis, and the surfaces have positive refracting power that the refracting power at a position on the surface decreases as a distance between a position on the surface and the optical axis increases.

The image forming optical system of the present invention is characterized in that in an image forming optical system comprising a front group having negative refracting power and a rear group having positive refracting power, which are arranged in order from an object side; the front group has a first lens having negative refracting power, and a second lens of a meniscus form having a convex surface directed toward an image side, which are arranged in order from the object side; and the second lens element of the meniscus form, a surface of which is directed toward the image side; and the rear group comprises at least two sheets of positive lens, and an aperture stop; wherein the first lens has aspherical surfaces; a surface directed toward the object side is concave in the vicinity of the optical axis; negative refracting power at a position on the surface becomes weak as a distance between the position on the surface and the optical axis increases; and a surface directed toward the image side is concave at least in the vicinity of the optical axis. And a lens at the utmost image side in the rear group has aspherical surfaces, wherein a surface directed toward the object side is convex at least in the vicinity of the optical axis; and a surface directed toward the image side that is convex in the vicinity of the optical axis; and positive refracting power at a position on the surface becomes weak as a distance between the position on the surface and the optical axis increases.

In the image forming optical system of a the present invention, it is desired that a surface at an object side of the first lens is an aspherical surface, wherein a surface directed toward object side is concave in the vicinity of the optical axis, and negative refracting power at a position on the surface decreases, and positive refracting power at a position on the surface increases as a distance between the position on the surface and the optical axis increases.

In the image forming optical system of the present invention, it is desired that the following condition (3) is satisfied:

$$1.7 < n_1 < 2.2 \tag{3}$$

where $n_1$ is an index of refraction of d line of the first lens.

In the image forming optical system of the present invention, it is desired that material of the first lens is glass.

Furthermore, in the image forming optical system of the present invention, when the rear group has two or more sheets of positive lens, it is desired that the following condition (4) is satisfied:

$$0.2 < |f_{G1F}|/f_{G2F} < 0.5 \qquad (4)$$

where $f_{G1F}$ is a focal length of the first lens group, and $f_{G2F}$ is a focal length of a positive lens at the utmost object side in the rear group.

According to the present invention, an image forming optical system such that even though a diagonal angle of view is about 130° or more, the distortion aberration is as small as 15% or less, F number is as bright as 2.8, and the number of sheets of lenses is small can be offered.

These and other features and advantages of the present invention will become apparent from the following detailed description of the preferred embodiments when taken in conjunction with the accompanying drawings.

BRIEF DESCRIPTION OF THE DRAWINGS

FIGS. 6A to 3D are aberration curve diagrams showing a spherical aberration, an astigmatism, a distortion, and a chromatic aberration of magnification, respectively in the image forming optical system of the embodiment 1 of the present invention.

DETAILED DESCRIPTION OF THE PREFERRED EMBODIMENTS

Prior to explaining embodiments of the image forming optical system according to the present invention, performance and effect by the constitution of the image forming optical system according to the present invention will be explained.

The image forming optical system of the present invention is an image forming optical system of retro focus type which has a front group with negative refracting power, and a rear group with a positive refracting power which are arranged in order from an object side.

Such retro focus type optical system has been generally adopted for a wide angle optical system, by which back focus can be secured to some extent, and an exit pupil position can be arranged at a distant position. Therefore, it can be constituted as a nearly telecentric optical system, and since a chief ray can be entered at an angle nearly perpendicularly to an image pick-up surface, so called shading can be suppressed advantageously.

However, when it is constituted that a diagonal angle of view is made as wide angle of about 130° or more in the retro focus type optical system, since a focal length of the whole system has to be made small, it is necessary to strengthen the negative refracting power of the front group and to shift its principal-point position toward the image side. When it is constituted in such way as mentioned above, it is necessary to constitute the rear group appropriately in order to correct an aberration generated, and if the positive refracting power of the rear group is strengthened too much, a spherical aberration and a distortion which are generated by each group become large too much. By such reasons, when the retro focus type optical system is used for a camera mounted on a car, or a monitoring camera, it is necessary to miniaturize the optical system. Therefore, the refracting powers of the front group and the rear group are inevitable to be strengthened. Particularly, as the negative refracting power of the front group is inevitable to be very high, a large negative distortion aberration is easily generated. Accordingly, a size of an image of a circumference portion becomes very small comparing with that of an image of the central portion of the image obtained, and in some cases, exact information on the circumference portion cannot be obtained.

Furthermore, as for a linear object, since its image at the circumference portion is formed as bent shape, there is a case such that a shape of the image of the object that is actually observed with the naked eye may differ from the shape of the image of the object observed through a monitor.

Here, explanation as to distortion will be made. A distortion generated is influenced greatly by a symmetrical relation between the refracting power of the lens group at the object side from the aperture stop, and the refracting power of the lens group at the image side from the aperture stop. In concrete explanation, when the negative refracting power of the lens group at the object side is larger than the negative refracting power of the lens group at the image side from the aperture stop, or when the positive refracting power of the lens group at the image side from the aperture stop is larger than the positive refracting power of the lens group at the object side, a negative distortion is easily generated. When the positive refracting power of the lens group at the object side is larger than the positive refracting power of the lens group at the image side from the aperture stop, or when the negative refracting power of the lens group at the image side is larger than the negative refracting power of the lens group at the object side from the aperture stop, a positive distortion is easily generated.

Therefore, in order to suppress the distortion at small level, it is possibly constituted that the refracting power of the lens groups before and behind the aperture stop may be set nearly symmetrical. However, it is difficult to have such constitution as mentioned above, while realizing wide angle of view and small-sizing. Accordingly, it is desired that each of the lens groups is constituted so that the distortion may not generate as much as possible in each of lens groups arranged before and behind the aperture stop, respectively.

Accordingly, the image forming optical system of the present invention is constituted such that the front group comprises, in order from an object side, a first lens having negative refracting power, and a second lens having a meniscus form, a convex surface of which is directed toward an image side; and the first lens has aspherical surfaces, wherein a surface directed toward the object side is concave in the vicinity of the optical axis, and has negative refracting power that the refracting power at a position on the surface decreases as a distance between the position on the surface and the optical axis increases; a surface directed toward the object side is concave in the vicinity of the optical axis, and a surface directed toward the image side that is concave at least in the vicinity of the optical axis.

By constituting in this way, a negative distortion which gets worse as the negative refracting power of the front group becomes stronger can fully be corrected.

It is further desirable to constitute such that the surface directed toward the object side of the first lens may be an aspherical surface where the refracting power at a position on the surface is changed according to a distance from the optical axis to the surface so that the surface may be concave in the vicinity of the optical axis, and may be a convex in the vicinity of the lens perimeter portion.

The image forming optical system of the present invention is constituted so that the following conditions (1) and (2) may be satisfied:

$$1.0 < |f_{G1}|/F_A < 10 \quad (1)$$

$$1.0 < f_{G2}/F_A < 10 \quad (2)$$

where $F_A$ is a focal length of the whole optical system, $f_{G1}$ is a focal length of the front group, and $f_{G2}$ is a focal length of the rear group.

If it is constituted that the conditions (1) and (2) may be satisfied, miniaturization of the optical system and its back focus can be surely attained together.

Since it is constituted so that it may not be less than the minimum of condition (1), the negative refracting power of the front group does not become strong too much, and the negative large distortion does not occur. Furthermore, since it is constituted so that it may not exceed the maximum of condition (1), the optical system becomes compact, and accordingly, sufficient back focus can be surely obtained.

Furthermore, since it is constituted so that it may not be less than the minimum of condition (2), the positive refracting power of the rear group does not become strong too much, and a large negative spherical aberration does not occur. And, since it is constituted so that it may not exceed the maximum of condition (2), the optical system becomes compact, and accordingly, sufficient back focus can be surely obtained.

It is more desirable to constitute that in place of the condition (1), any of the following conditions (1)', (2)'', and (1)''' is satisfied:

$$2.0 < |f_{G1}|/F_A < 8 \quad (1)'$$

$$2.0 < |f_{G1}|/F_A < 10 \quad (1)''$$

$$1.0 < |f_{G1}|/F_A < 8 \quad (1)'''$$

It is further more desirable to constitute that in place of the condition (2), any of the following conditions (2)', (2)'', and (2)''' is satisfied:

$$2.0 < f_{G2}/F_A < 7 \quad (2)'$$

$$2.0 < f_{G2}/F_A < 10 \quad (2)''$$

$$1.0 < f_{G2}/F_A < 7 \quad (2)'''$$

The image forming optical system of the present invention is constituted such that the rear group comprises at least two sheets of positive lens element and an aperture stop, and a lens at the utmost image side in the rear group has a surface directed toward the object side that is a convex at least in the vicinity of the optical axis, and a surface directed toward the image side that is a convex in the vicinity of the optical axis, and an aspherical surface having positive refracting power that the refracting power at a position on the surface decreases as a distance between the position on the surface and the optical axis increases.

By constituting that two or more sheets of positive lens are arranged in the rear group having positive refracting power, and the refracting power is shared with these lenses, when the optical system is miniaturized, the positive spherical aberration which becomes large as the positive refracting power of the rear group becomes strong can be corrected.

In the image forming optical system of the present invention, it is desirable to satisfy the following condition (3):

$$1.7 < n_1 < 2.2. \quad (3)$$

where $n_1$ is an index of refraction of d line of the first lens.

As mentioned above, in order to attain wide angle of view, and the miniaturization of the optical system together, it is necessary to give strong negative refracting power to the front group. Namely, it is necessary to shorten the focal length of the negative lens in the front group as much as possible. However, if the radius of curvature of the lens surface is made small in order to shorten the focal length, processing and measurement of the lens become difficult, and it is disadvantageous to manufacture it.

If it is constituted so that it may not be less than the minimum of condition (3), radii of curvature of both surfaces of the first lens, or especially a surface directed toward the image side will not become small too much, and accordingly processing of a lens can be made easily. If it is constituted that it may not exceed the maximum of condition (3), a range of possible selection of a material which can be used as the first lens becomes larger, and it is easy to reduce manufacturing cost.

Here, in the image forming optical system of the present invention, it is more desired that it is constituted that any of the following conditions (3)', (3)'', and (3)''' is satisfied in place of the condition (3):

$$1.8 < n_1 < 2.0 \quad (3)'$$

$$1.8 < n_1 < 2.2 \quad (3)''$$

$$1.7 < n_1 < 2.0 \quad (3)'''$$

Furthermore, in the image forming optical system of the present invention, it is desired that a material of first lens is glass. If the first lens is formed with glass, an optical system having high tolerance to environmental changes such as temperature change, humidity change, crack, etc. can be obtained.

In the image forming optical system of the present invention, it is desirable to satisfy the following condition (4):

$$0.2 < |f_{G1F}|/f_{G2F} < 0.5 \quad (4)$$

where $f_{G1}$ is a focal length of the first lens group, $f_{G2}$ is a focal length of a positive lens at the utmost image side in the rear group.

If it is constituted so that the conditions (1) and (2) may be satisfied, a distortion generated in the first lens having the negative refracting power in the front group can be easily corrected by the rear group.

If it is constituted so that it may not be less than the minimum of condition (4), increase of a negative distortion generated in the first lens can be suppressed, and the negative distortion can be suppressed small. If it is constituted that it may not exceed the maximum of condition (4), an excessive correction effect of the second lens group to the negative distortion generated in the first lens can be suppressed, and the positive distortion can be suppressed small.

Hereafter, the embodiment 1 to the embodiment 4 of the optical system according to the present invention will be explained using drawings. Numerical symbols shown as subscripts (inferior letters) in $r_1, r_2, \text{---}$, and $d_1, d_2, \text{---}$, in the sectional diagram in the optical system, corresponds to surface numbers 1, 2 ----, in numerical data tables. In the aberration diagram, $\Delta M$ in astigmatism represents the astigmatism of a merigional plane, and $\Delta S$ represents the astigmatism of a Sagittal plane. Here, the merigional plane is a plane (plane parallel to this document plane) including the optical axis and the chief ray of an optical system. Sagittal plane is a plane (plane perpendicular to this document plane) including the optical axis and the chief ray of the optical system.

In the numerical data of the lens in each of the following embodiments, R is a radius of curvature of each surface, D is a surface interval, Nd is an index of refraction in d line, vd is an Abbe number in d line, K is a conic coefficient, and $A_4, A_6, A_8$, and $A_{10}$ are aspherical surface coefficients, respectively.

Each aspherical surface form is expressed by the following formula using each aspherical surface coefficient in each embodiment.

$$Z = (Y^2/r) / \left[1 + \{1 \cdot (1+K) \cdot (Y/r)^2\}^{1/2}\right] + A_4 Y^4 + A_6 Y^6 + A_8 Y^8 + A_{10} Y^{10} + \ldots$$

where a coordinate of the direction in parallel to the optical axis is Z, and a coordinate of a direction perpendicular to an optical axis is Y.

Embodiment 1

Figure 1:
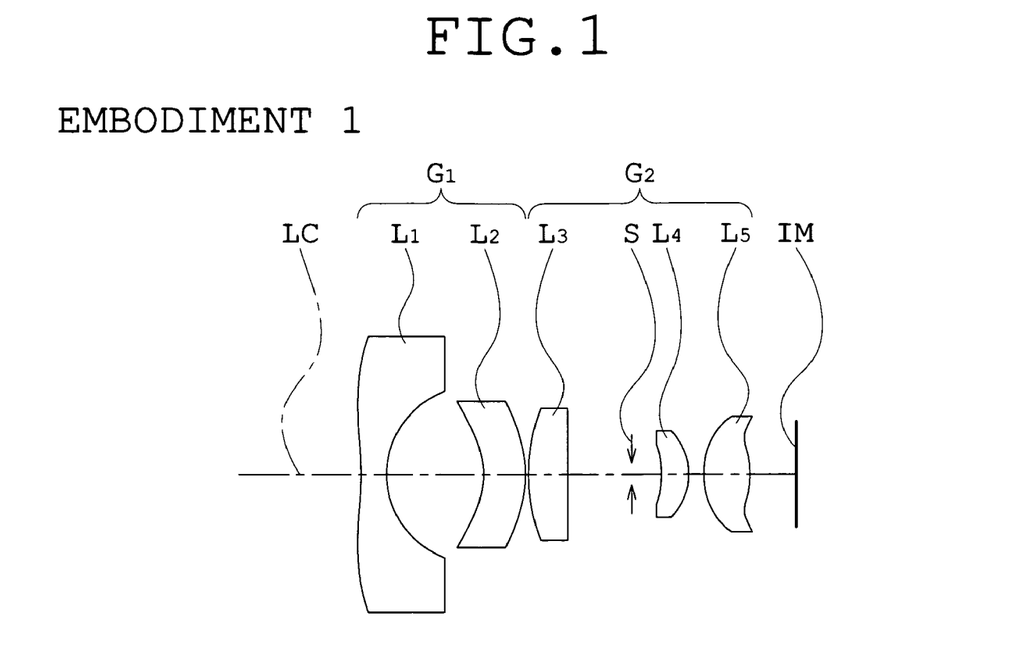
FIG. 1 is a sectional diagram showing an optical arrangement developed along an optical axis of an image forming optical system of the embodiment 1 according to the present invention.
Figure 2:
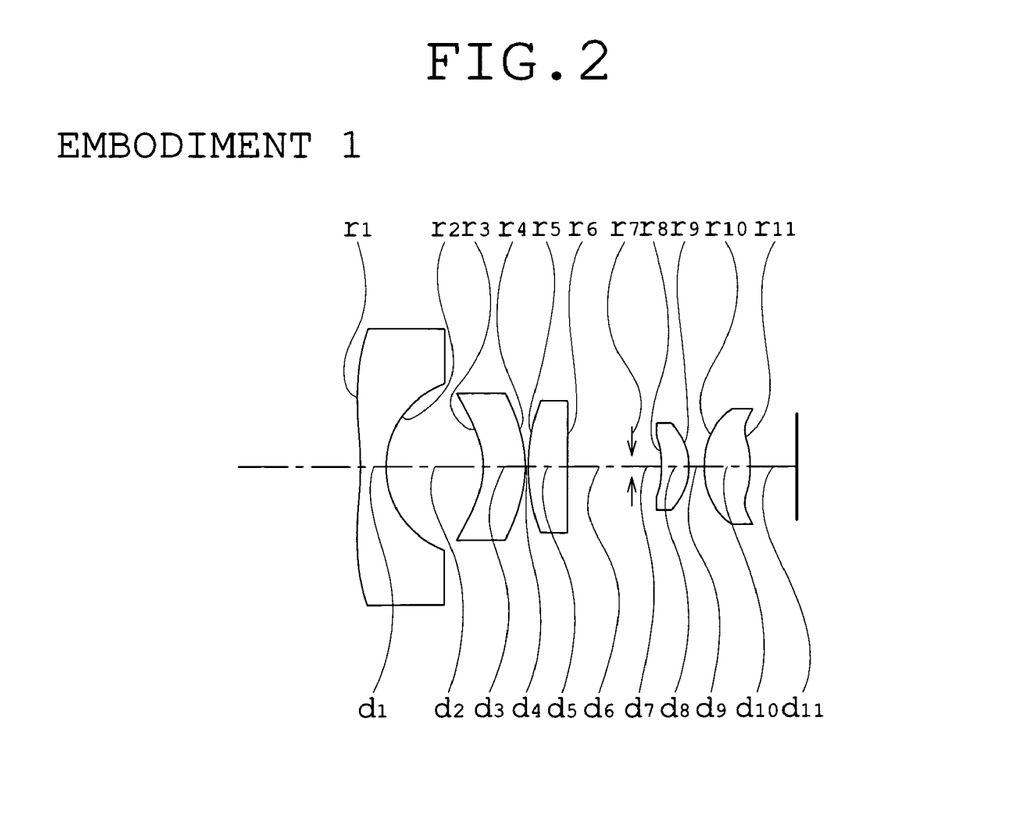
FIG. 2 is a sectional diagram showing surfaces and surface intervals developed along an optical axis of the image forming optical system shown in FIG. 1.
Figure 3A:
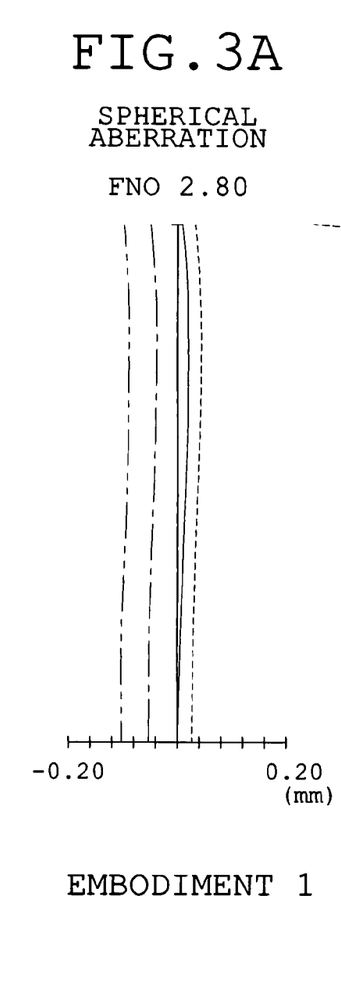
FIGS. 3A to 3D are aberration curve diagrams showing a spherical an aberration, an astigmatism, a distortion aberration and a chromatic aberration of magnification, respectively in the image forming optical system of the embodiment 1 of the present invention.
Figure 3B:
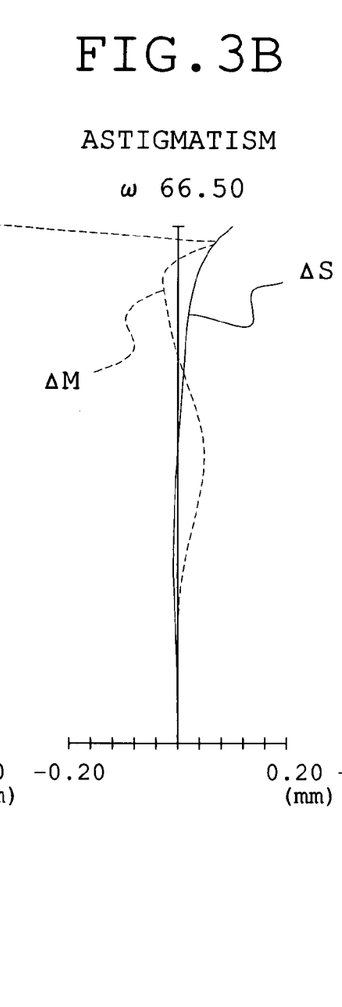
Figure 3C:
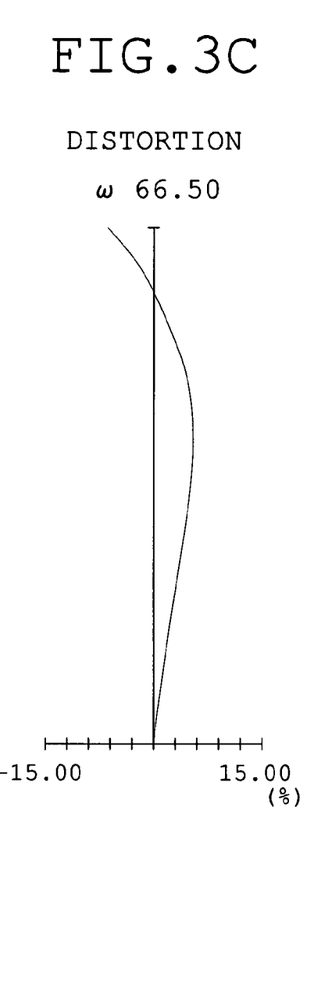
Figure 3D:
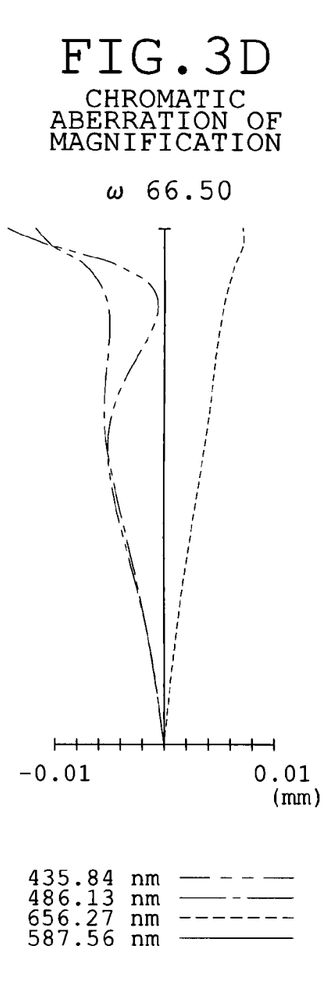

FIG. 1 is a sectional diagram showing an optical arrangement developed along an optical axis of an image forming optical system of the present embodiment. FIG. 2 is a sectional diagram showing surfaces, and surface intervals developed along an optical axis of the image forming optical system shown in FIG. 1. FIGS. 3A, 3B, 3C and 3D are aberration curve diagrams showing a spherical aberration, an astigmatism, a distortion, and a chromatic aberration of magnification respectively, in the image forming optical system of the present embodiment.

First, the constitution of the optical system of the present embodiment will be explained with reference to FIGS. 1 and 2. The optical system of the present embodiment is an optical system of a retro focus type. On the optical axis $L_C$, in order from an object side, a first lens group $G_1$ having negative refracting power that is a front group, a second lens group $G_2$ having positive refracting power that is a rear group are arranged. At an image side of the second lens group $G_2$, an imaging sensor having an image pick-up plane IM such as CCD, CMOS etc., are arranged.

The first lens group $G_1$ comprises, in order from an object side, a first lens $L_1$ having negative refracting power where the surface directed toward the object side is an aspherical surface, and its refracting power is changed according to a distance from the optical axis to the surface so that the surface may be concave in the vicinity of the optical axis, and may be convex in the vicinity of the lens perimeter portion, and the surface directed toward the image side is concave at least in the vicinity of the optical axis; and a second lens $L_2$ having a meniscus form with convex surfaces directed toward the image side, both surfaces of which are aspherical surfaces.

The second lens group $G_2$ comprises, in order from an object side, a third lens $L_3$ that is a bi-convex lens, an aperture stop 14, a fourth lens $L_4$ having meniscus form with convex surfaces directed toward the image side, and both surfaces of which are aspherical surfaces, and a fifth lens $L_5$ that has aspherical surfaces by which the refracting power is changed according to distance from the optical axis, wherein a surface directed toward the object side is a convex at least in the vicinity of the optical axis, and a surface directed toward the image side is a convex in the vicinity of the optical axis and it becomes a convex surface in the vicinity of the lens perimeter portion.

Next, a constitution and numerical data of a lens which constitute each optical system concerning the present embodiment are shown. Here, a unit of length is expressed by mm. ASP represents aspherical surface, and AP represents aperture stop.

| Surface number | Surface data: | | | |
|---|---|---|---|---|
| | Radius of curvature R | Surface (air) interval D | Refraction index Nd | Abbe's number vd |
| 1 (ASP) | −17.671 | 1.05 | 1.83481 | 42.71 |
| 2 (ASP) | 3.712 | 3.98 | | |
| 3 (ASP) | −3.860 | 1.72 | 1.51823 | 58.90 |
| 4 (ASP) | −5.223 | 0.12 | | |

-continued

| Surface | R | d | n | ν |
|---|---|---|---|---|
| 5 | 7.725 | 1.60 | 1.92286 | 18.90 |
| 6 | −380.892 | 2.63 | | |
| 7 (AP) | ∞ | 1.21 | | |
| 8 (ASP) | −24.629 | 1.11 | 1.51823 | 58.90 |
| 9 (ASP) | −21.919 | 0.63 | | |
| 10 (ASP) | 2.514 | 1.85 | 1.51823 | 58.90 |
| 11 (ASP) | −2.514 | | | |

Aspherical surface data:

| Surface number | Radius of curvature R | Conic coefficient K | Aspherical surface coefficients | | | |
|---|---|---|---|---|---|---|
| | | | $A_4$ | $A_6$ | $A_8$ | $A_{10}$ |
| 1 | −17.671 | −253.782 | 4.87573e−04 | 7.01461e−06 | −1.60882e−07 | |
| 2 | 3.712 | 0.000 | −2.59332e−03 | −4.63264e−05 | 6.07819e−06 | 2.57587e−07 |
| 3 | −3.860 | −1.461 | −8.48420e−04 | 1.90657e−05 | 5.82225e−06 | 1.03991e−06 |
| 4 | −5.223 | −1.133 | −2.27319e−04 | −2.56140e−05 | 4.71655e−06 | 1.00864e−06 |
| 8 | −24.629 | 0.000 | −1.01797e−01 | 4.20139e−02 | −2.61574e−03 | |
| 9 | −21.919 | 0.000 | −1.12497e−01 | 1.86972e−02 | | |
| 10 | 2.514 | −0.001 | −4.49528e−02 | 1.02913e−02 | −1.04666e−03 | |
| 11 | −2.514 | −0.015 | 5.61358e−02 | 1.24435e−04 | −4.06582e−05 | |

Various data:

| | |
|---|---|
| Focal length of the whole system: | 1.04 mm |
| F number (FNO): | 2.80 |
| Half angle of view (ω): | 66.50° |
| Image height: | 2.25 mm |
| Total length of lenses: | 17.81 mm |
| Back focus: | 1.90 mm |

Data concerning the conditions mentioned above:

| | |
|---|---|
| Condition (1): | $1.0 < |f_{G1}|/F_A < 10$: 3.3 |
| Condition (2): | $1.0 < f_{G2}/F_A < 10$: 5.1 |
| Condition (3): | $1.7 < n_1 < 2.2$: 1.835 |
| Condition (4): | $0.2 < |f_{G1F}|/f_{G2F} < 0.5$: 0.437 |

Embodiment 2

Figure 4:
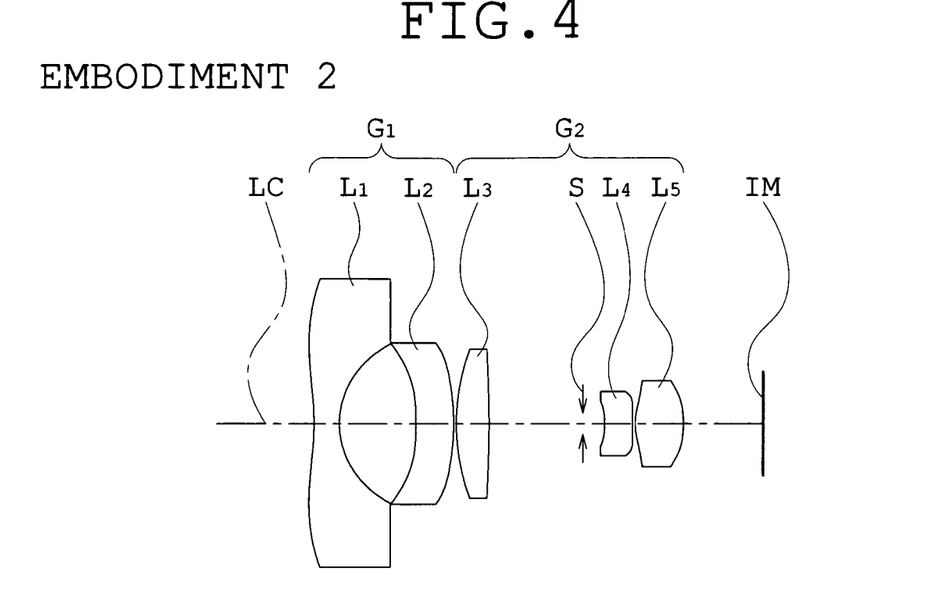
FIG. 4 is a sectional diagram showing an optical arrangement developed along an optical axis of an image forming optical system of the embodiment 2 according to the present invention.
Figure 5:
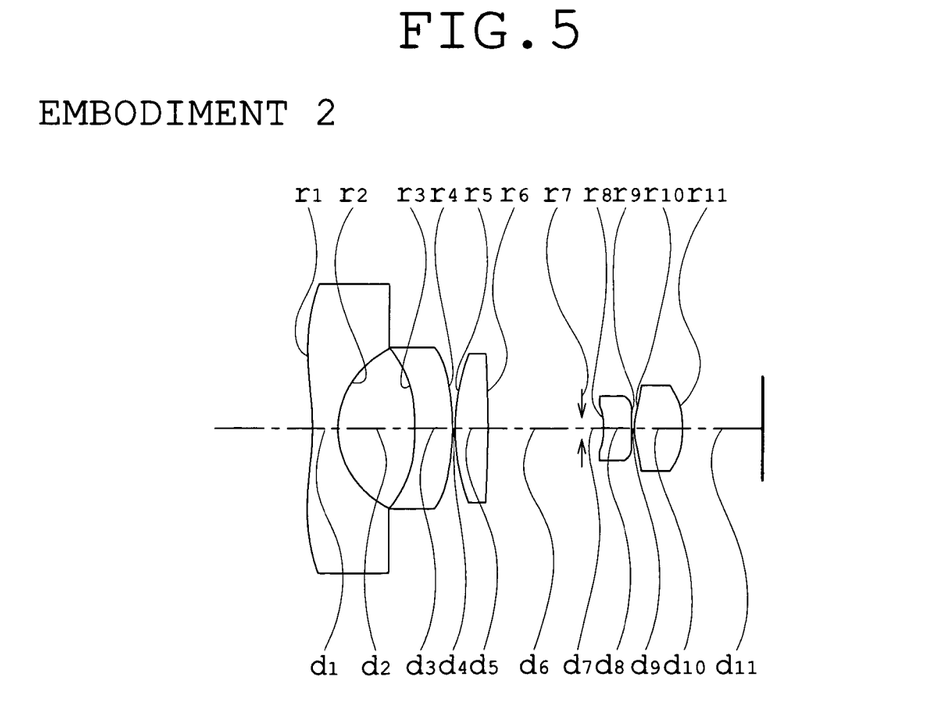
FIG. 5 is a sectional diagram showing surfaces and surface intervals developed along an optical axis of the image forming optical system shown in FIG. 4.
Figure 6A:
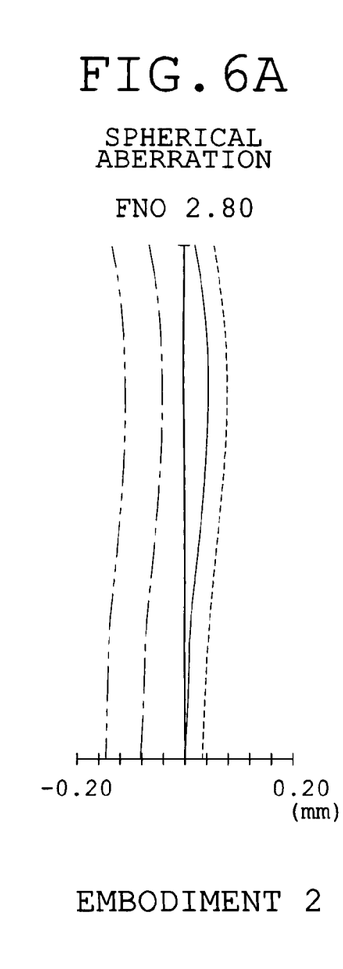
Figure 6B:
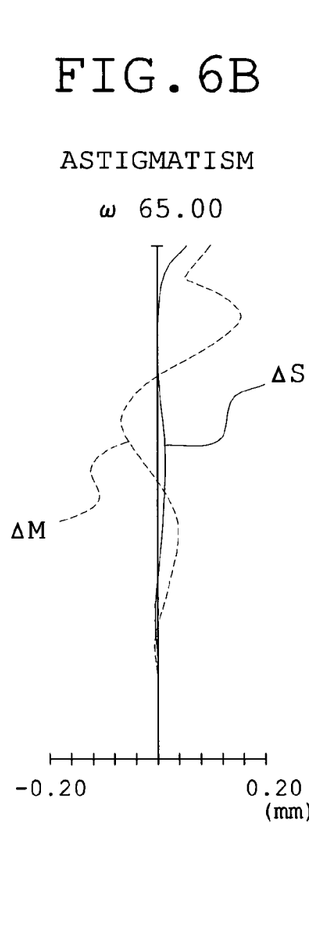
Figure 6C:
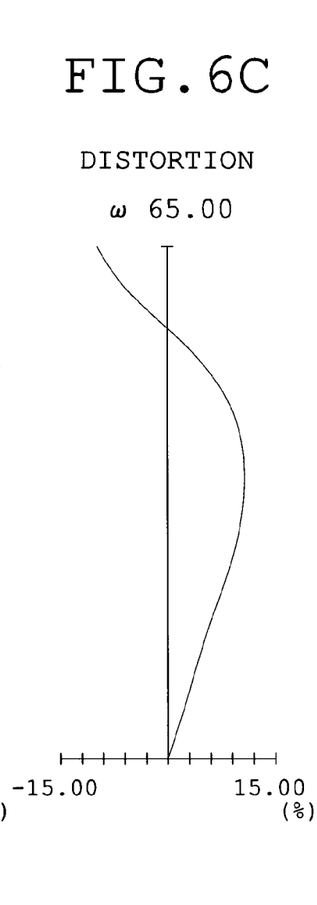
Figure 6D:
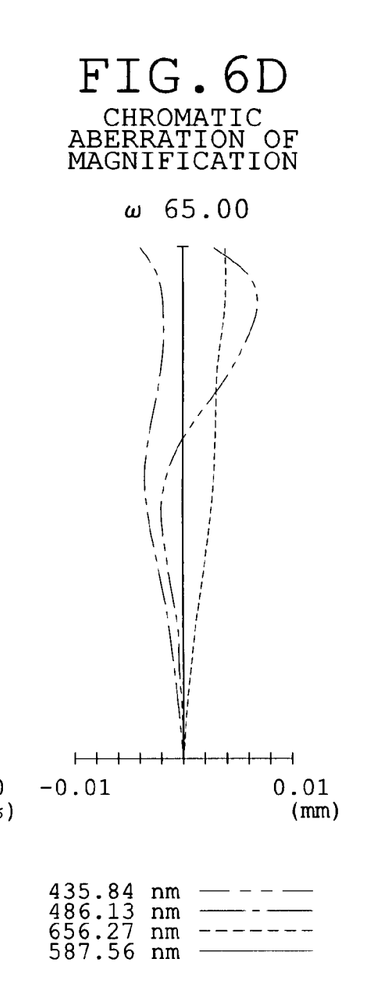

FIG. 4 is a sectional diagram showing an optical arrangement developed along an optical axis of an image forming optical system of the embodiment 2 according to the present invention. FIG. 5 is a sectional diagram showing surfaces and surface intervals developed along an optical axis of the image forming optical system shown in FIG. 4. FIGS. 6A, 6B, 6C and 6D are aberration curve diagrams showing a spherical aberration, an astigmatism, a distortion, and a chromatic aberration of magnification, respectively, in the image forming optical system of the present embodiment.

First, the constitution of the optical system of the present embodiment will be explained with reference to FIGS. 4 and 5. The optical system of the present embodiment is an optical system of a retro focus type. On an optical axis Lc, a first lens group $G_1$ having negative refracting power which is a front group, and a second lens group $G_2$ having positive refracting power which is a rear group are arranged in order from an object side. An image sensor with an image pick-up plane IM such as CCD, CMOS, etc., are arranged at an image side of the second lens group $G_2$.

The first lens group $G_1$ comprises, in order from the object side, a first lens $L_1$ having negative refraction power, and a second lens $L_2$ having meniscus form with convex surfaces directed toward the image side, and both surface of which are aspherical surfaces. The first lens has an aspherical surface directed toward the object side, wherein the refracting power is changed according to a distance from the optical axis to the surface so that the surface may be concave in the vicinity of the optical axis, and it may be convex in the vicinity of the lens perimeter portion, and the surface directed toward the image side may be concave at least in the vicinity of the optical axis.

The second lens group $G_2$ comprises, in order from an object side, a third lens $L_3$ that is a bi-convex lens, an aperture stop S, a fourth lens $L_4$ having meniscus form with convex surfaces directed toward the image side, and aspherical surfaces, and a fifth lens $L_5$ in which a surface directed toward the object side is a convex at least in the vicinity of the optical axis, and an aspherical surface, wherein the refracting power of the aspherical surface directed toward the image side is changed according to a distance from the optical axis to the surface so that the surface may be convex in the vicinity of the optical axis, and it may be concave in the vicinity of the lens perimeter portion.

Next, a constitution and numerical data of a lens which constitute each optical system concerning the present are shown. Here, a unit of length is expressed by mm. ASP represents aspherical surface, and AP represents aperture stop.

Surface data:

| Surface number | Radius of curvature R | Surface (or air) interval D | Refraction index Nd | Abbe's number νd |
|---|---|---|---|---|
| 1 (ASP) | −6.925 | 1.09 | 1.83481 | 42.71 |
| 2 (ASP) | 3.637 | 3.20 | | |
| 3 (ASP) | −9.253 | 1.55 | 1.52542 | 55.78 |
| 4 (ASP) | −10.146 | 0.10 | | |
| 5 | 8.890 | 1.39 | 1.92286 | 18.90 |
| 6 | −52.145 | 3.91 | | |
| 7 (AP) | ∞ | 0.90 | | |
| 8 (ASP) | −7.193 | 1.16 | 1.52542 | 55.78 |
| 9 (ASP) | 19.556 | 0.12 | | |
| 10 (ASP) | 3.279 | 2.00 | 1.52542 | 55.78 |
| 11 (ASP) | −2.240 | | | |

Aspherical surface data:

| Surface number | Radius of curvature R | Conic coefficient K | $A_4$ | $A_6$ | $A_8$ | $A_{10}$ |
|---|---|---|---|---|---|---|
| 1 | −6.925 | −62.618 | 6.26485e−04 | 3.36421e−06 | −8.42349e−08 | |
| 2 | 3.637 | 0.000 | −2.74895e−03 | −2.89062e−04 | 2.95898e−05 | |
| 3 | −9.253 | 1.991 | −6.17712e−03 | 5.16720e−04 | −4.67396e−05 | 2.19698e−06 |
| 4 | −10.146 | 4.501 | −8.32619e−04 | −3.22143e−05 | −1.45288e−06 | 5.73306e−07 |
| 8 | −7.193 | 0.000 | −1.03939e−01 | 6.46678e−02 | −3.14441e−02 | |
| 9 | 19.556 | 0.000 | −1.15897e−01 | 3.17664e−02 | −7.18272e−03 | |
| 10 | 3.279 | 0.000 | −4.70858e−02 | 1.26208e−02 | −2.04911e−03 | |
| 11 | −2.240 | 0.000 | 4.78339e−02 | −4.29579e−03 | 6.74878e−04 | |

Various data:

| | |
|---|---|
| Focal length of the whole system: | 1.04 mm |
| F number-: | 2.80 |
| Half-angle of view: | 65.00° |
| Image height: | 2.25 mm |
| Total length of lenses: | 18.73 mm |
| Back focus: | 3.32 mm |

Data concerning the condition mentioned above:

| | |
|---|---|
| Condition (1): | $1.0 < |f_{G1}|/F_A < 10$: 2.44 |
| Condition (2): | $1.0 < f_{G2}/F_A < 10$: 5.6 |
| Condition (3): | $1.7 < n_1 < 2.2$: 1.835 |
| Condition (4): | $0.2 < |f_{G1F}|/f_{G2F} < 0.5$: 0.328 |

Embodiment 3

Figure 7:
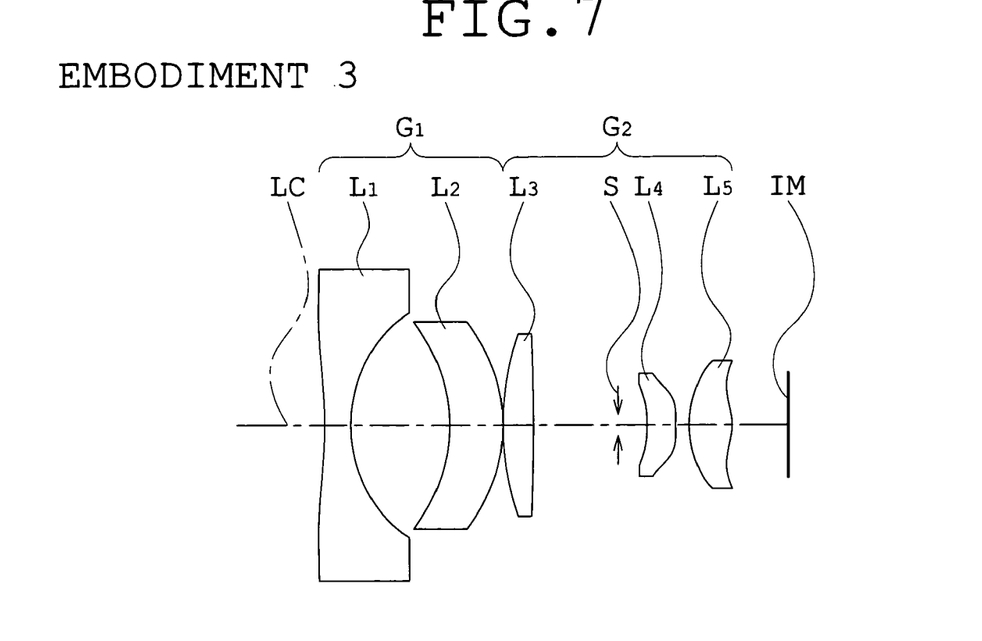
FIG. 7 is a sectional diagram showing an optical arrangement developed along an optical axis of an image forming optical system of the embodiment 3 according to the present invention.
Figure 8:
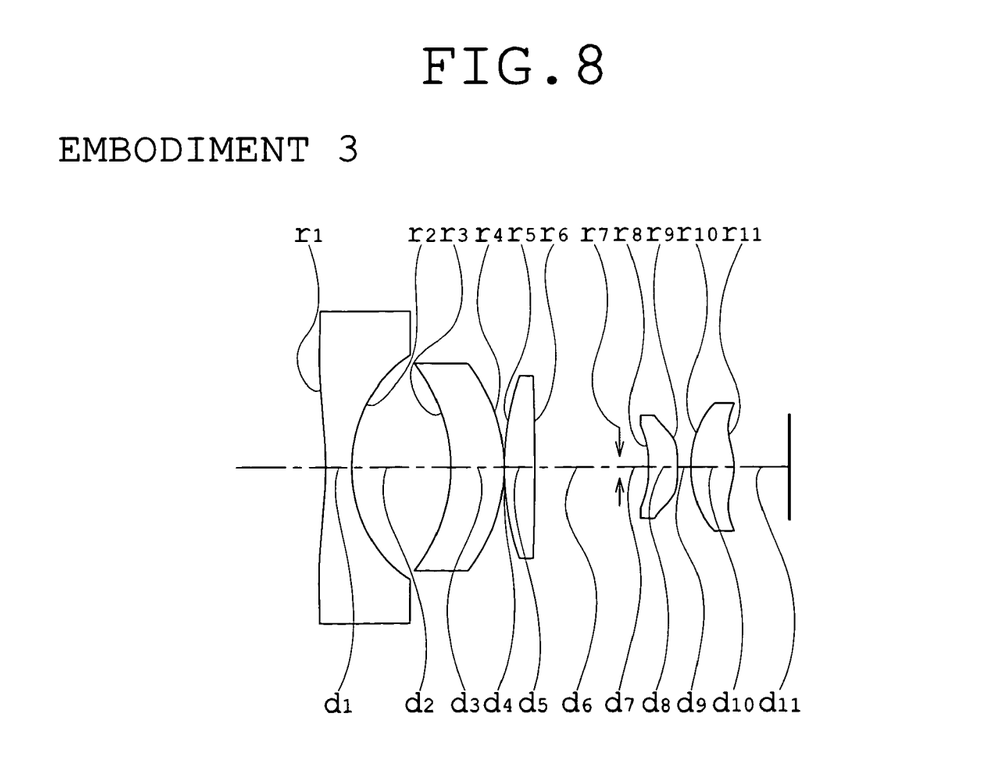
FIG. 8 is a sectional diagram showing surfaces and surface intervals developed along an optical axis of the image forming optical system shown in FIG. 7.
Figure 9A:
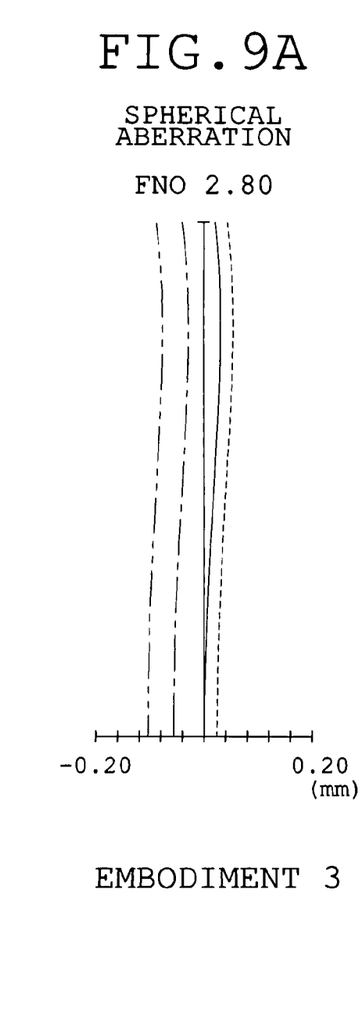
FIGS. 9A to 9D are aberration curve diagrams showing a spherical aberration, an astigmatism, a distortion, and a chromatic aberration of magnification, respectively in the image forming optical system of the embodiment 3 of the present invention.
Figure 9B:
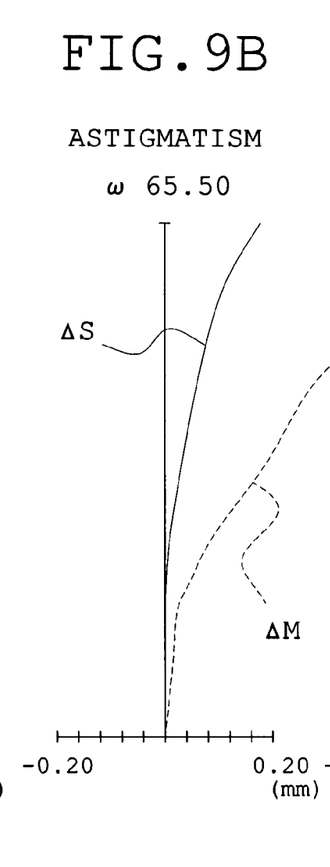
Figure 9C:
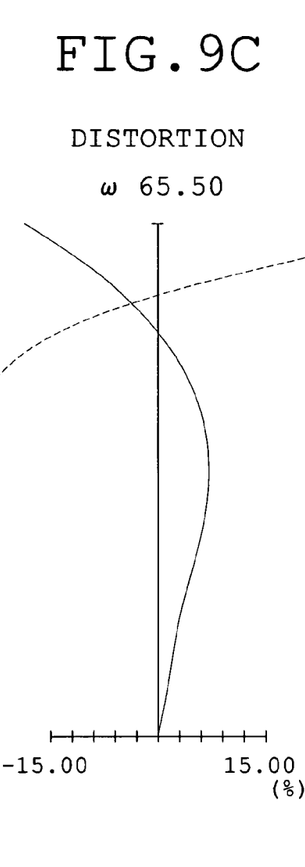
Figure 9D:
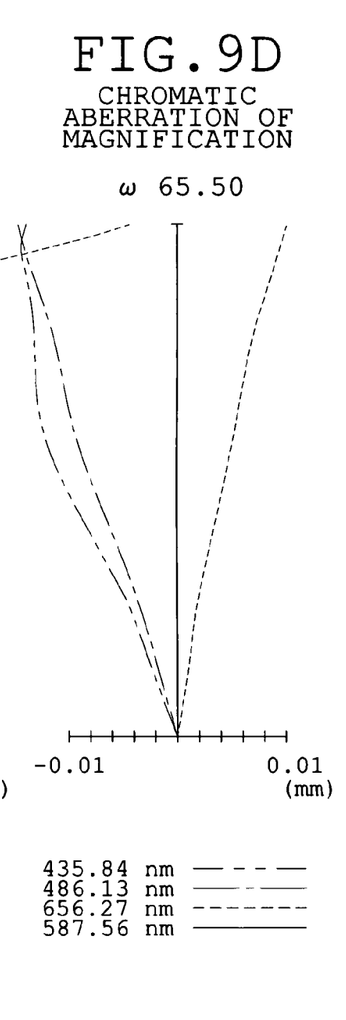

FIG. 7 is a sectional diagram showing an optical arrangement developed along an optical axis of an image forming optical system of the embodiment 2 according to the present invention. FIG. 8 is a sectional diagram showing surfaces and surface intervals developed along an optical axis of the image forming optical system shown in FIG. 7. FIGS. 9A, 9B, 9C and 9D are aberration curve diagrams showing a spherical aberration, an astigmatism, a distortion, and a chromatic aberration of magnification, respectively, in the image forming optical system of the present embodiment.

First, the constitution of the optical system of the present embodiment will be explained with reference to FIGS. 7 and 8. The optical system of the present embodiment is an optical system of a retro focus type. On an optical axis Lc, a first lens group $G_1$ having negative refracting power which is a front group, and a second lens group $G_2$ having positive refracting power which is a rear group are arranged in order from an object side. An image sensor with an image pick-up plane IM such as CCD, CMOS, etc., are arranged at an image side of the second lens group $G_2$.

The first lens group $G_1$ comprises, in order from an object side, a first lens $L_1$ having negative refraction power, and a second lens $L_2$ which is meniscus form having convex surfaces directed toward the image side, and aspherical surfaces. The first lens has an aspherical surface directed toward the object side, wherein the refracting power is changed according to a distance from the optical axis to the surface so that the surface may be concave in the vicinity of the optical axis, and it may be convex in the vicinity of the lens perimeter portion.

The second lens group G comprises, in order from an object side, a third lens $L_3$ that is a bi-convex lens, an aperture stop 14, a fourth lens $L_4$, which has a surface directed toward the object side being a concave at least in the vicinity of the optical axis, and an aspherical surface directed toward the object side, wherein the refracting power is changed according to a distance from the optical axis to the surface so that the surface becomes concave in the vicinity of the optical axis, and it becomes a convex in the vicinity of the lens perimeter portion, and a fifth lens $L_5$, which has a surface directed toward the object side being a convex at least in the vicinity of the optical axis, And an aspherical surface, wherein the refracting power is changed according to a distance from the optical axis to the surface so that the surface may be convex in the vicinity of the optical axis, and it may be a concave in the vicinity of the lens perimeter portion.

Next, a constitution and numerical data of a lens which constitute each optical system concerning the present are shown. Here, a unit of length is expressed by mm. ASP represents aspherical surface, and AP represents aperture stop.

Figure 11:
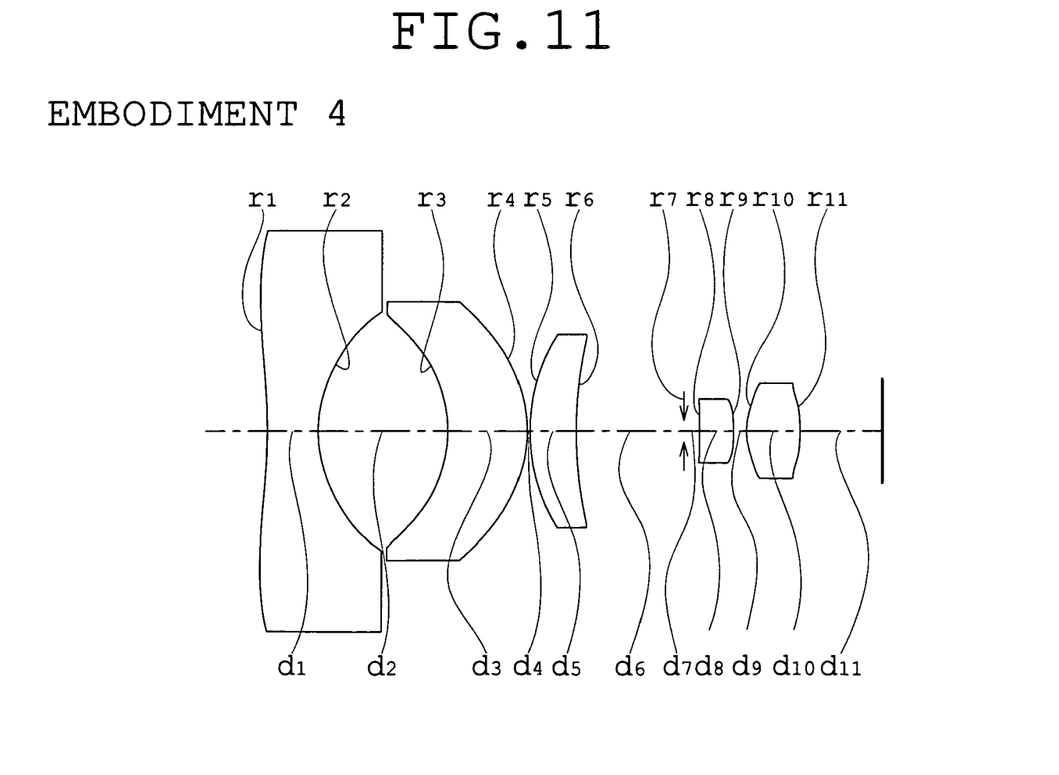
FIG. 11 is a sectional diagram showing surfaces and surface intervals developed along an optical axis of the image forming optical system shown in FIG. 10.
Figure 12A:
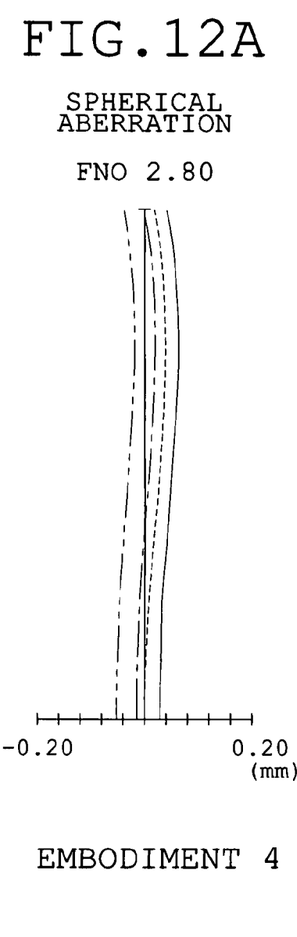
FIGS. 12A to 12D are aberration curve diagrams showing a spherical aberration, an astigmatism, a distortion, and a chromatic aberration of magnification, respectively in the image forming optical system of the embodiment 4 of the present invention.
Figure 12B:
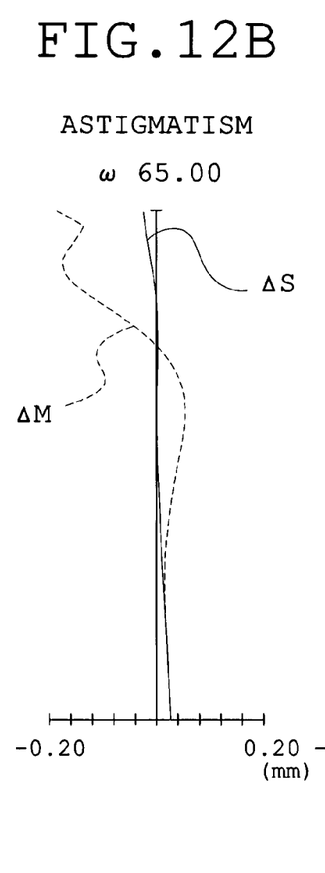
Figure 12C:
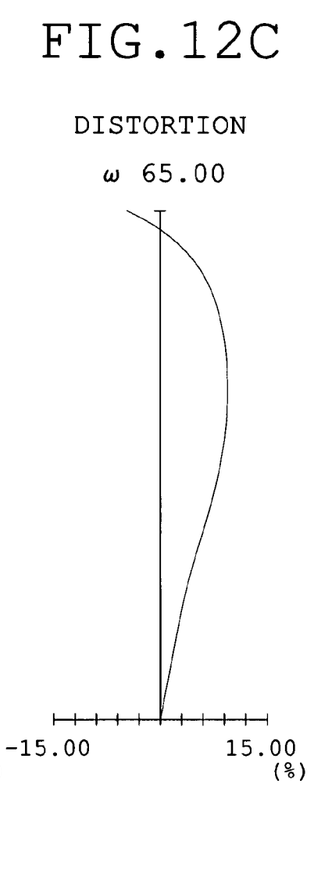
Figure 12D:
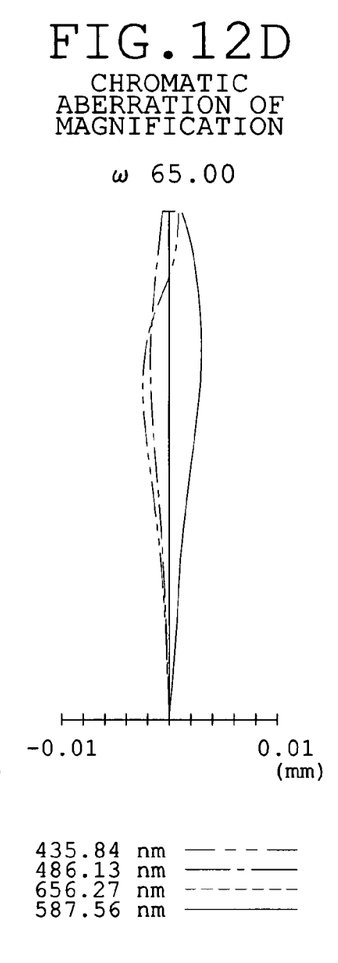

11. The optical system of the present embodiment is an optical system of a retro focus type. On an optical axis Lc in order from an object side, a first lens group $G_1$ having negative refracting power which is a front group, and a second lens group $G_2$ having positive refracting power which is a rear group are arranged. An image sensor with an image pick-up plane IM such as CCD, CMOS, etc., are arranged at an image side of the second lens group $G_2$.

Surface data:

| Surface number | Radius of curvature R | Surface (air) interval D | Refraction index Nd | Abbe's number νd |
|---|---|---|---|---|
| 1 (ASP) | −13.036 | 1.10 | 1.83481 | 42.71 |
| 2 (ASP) | 5.460 | 4.06 | | |
| 3 (ASP) | −6.594 | 2.20 | 1.52542 | 55.78 |
| 4 (ASP) | −6.594 | 0.00 | | |
| 5 | 11.964 | 1.27 | 1.92286 | 18.90 |
| 6 | −107.465 | 3.49 | | |
| 7 (AP) | ∞ | 1.17 | | |
| 8 (ASP) | −12.897 | 1.21 | 1.52542 | 55.78 |
| 9 (ASP) | −16.004 | 0.56 | | |
| 10 (ASP) | 2.871 | 1.77 | 1.52542 | 55.78 |
| 11 (ASP) | −2.824 | | | |

Aspherical surface data:

| Surface number | Radius of curvature R | Conic coefficient K | $A_4$ | $A_6$ | $A_8$ | $A_{10}$ |
|---|---|---|---|---|---|---|
| 1 | −13.036 | −384.780 | 1.90287e−04 | −7.05714e−07 | 6.96570e−10 | |
| 2 | 5.460 | 0.000 | −7.90470e−04 | 9.45887e−06 | 1.93836e−07 | |
| 3 | −6.594 | −1.658 | −5.46153e−04 | −1.55339e−06 | 6.41176e−08 | 4.40763e−09 |
| 4 | −6.594 | −1.046 | −1.87103e−04 | 1.04047e−07 | 1.56215e−08 | −6.96741e−10 |
| 8 | −12.897 | 0.000 | −8.95646e−02 | 3.08316e−02 | −3.17369e−03 | |
| 9 | −16.004 | 0.000 | −9.91087e−02 | 1.27938e−02 | −6.44907e−05 | |
| 10 | 2.871 | 0.000 | −3.98243e−02 | 7.65917e−03 | −6.26424e−04 | |
| 11 | −2.824 | 0.000 | 4.67177e−02 | −2.28125e−03 | 1.54259e−04 | |

Various data:

| | |
|---|---|
| Focal length of the whole system: | 1.04 mm |
| F number: | 2.80 |
| Half angle of view: | 65.50° |
| Image height: | 2.25 mm |
| Total length of lenses--: | 19.16 mm |
| Back focus: | 2.33 mm |

Data concerning the condition mentioned above:

| | |
|---|---|
| Condition (1): | $1.0 < |f_{G1}|/F_A < 10$: 4.17 |
| Condition (2): | $1.0 < f_{G2}/F_A < 10$: 3.8 |
| Condition (3): | $1.7 < n_1 < 2.2$: 1.835 |
| Condition (4): | $0.2 < |f_{G1F}|/f_{G2F} < 0.5$: 0.383 |

Embodiment 4

Figure 10:
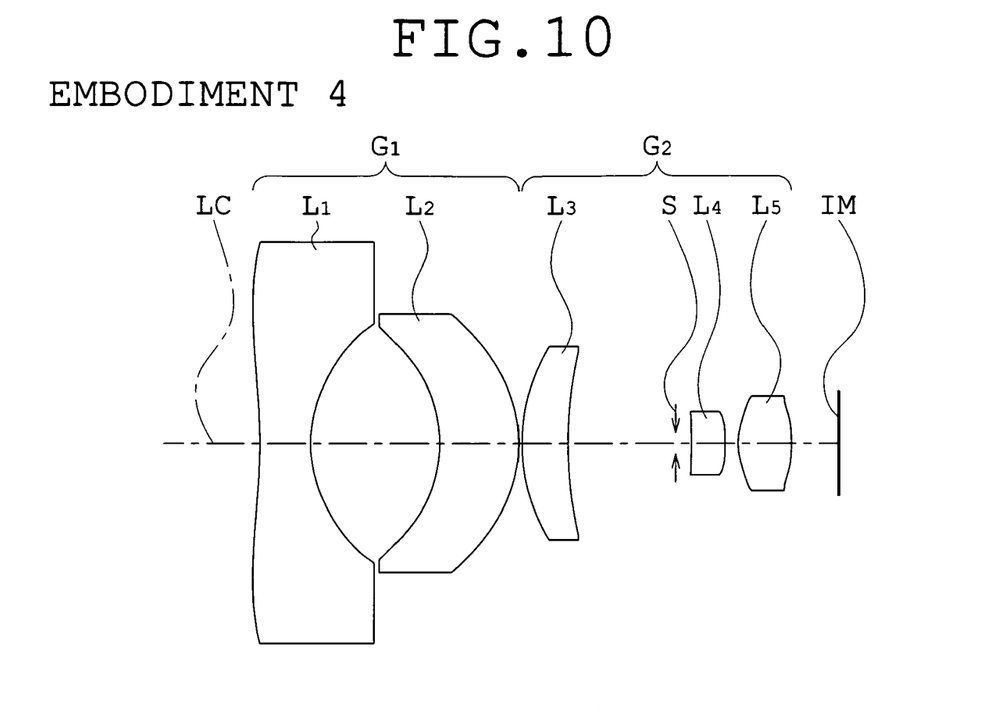
FIG. 10 is a sectional diagram showing an optical arrangement developed along an optical axis of an image forming optical system of the embodiment 4 according to the present invention.

FIG. 10 is a sectional diagram showing an optical arrangement developed along an optical axis of an image forming optical system of the embodiment 2 according to the present invention. FIG. 11 is a sectional diagram showing surfaces and surface intervals developed along an optical axis of the image forming optical system shown in FIG. 10. FIGS. 12A, 12B, 12C and 12D are aberration curve diagrams showing a spherical aberration, an astigmatism, a distortion, and a chromatic aberration of magnification, respectively, in the image forming optical system of the present embodiment.

First, the constitution of the optical system of the present embodiment will be explained with reference to FIGS. 10 and 11. The optical system of the present embodiment is an optical system of a retro focus type. On an optical axis Lc in order from an object side, a first lens group $G_1$ having negative refracting power which is a front group, and a second lens group $G_2$ having positive refracting power which is a rear group are arranged. An image sensor with an image pick-up plane IM such as CCD, CMOS, etc., are arranged at an image side of the second lens group $G_2$.

The first lens group $G_1$ comprises, in order from the object side, a first lens the surface directed toward the image side is concave at least in the vicinity of the optical axis, and a second lens which has meniscus form having convex surfaces directed toward the image side, and aspherical surfaces. The first lens has an aspherical surface directed toward the object side, wherein the refracting power is changed according to a distance from the optical axis to the surface so that the surface may be concave in the vicinity of the optical axis, and it may be convex in the vicinity of the lens perimeter portion.

The second lens group $G_2$ comprises, in order from an object side, a third lens $L_3$ which has a meniscus form with convex surfaces directed toward the image side, and aspherical surfaces, an aperture stop, the fourth lens $L_4$, which has a surface directed toward the object side being a convex at least in the vicinity of the optical axis, and an aspherical surface, wherein the refracting power is changed according to a distance from the optical axis to the surface so that the surface becomes concave in the vicinity of the optical axis, and it becomes a convex in the vicinity of the lens perimeter portion; and a fifth lens $L_5$ which has a surface directed toward the object side being a convex at least in the vicinity of the optical axis, and an aspherical surface, wherein the refracting power is changed according to a distance from the optical axis to the surface so that the surface may be convex in the vicinity of the optical axis, and it may be concave in the vicinity of the lens perimeter portion.

Next, a constitution and numerical data of a lens which constitute each optical system concerning the present are shown. Here, a unit of length is expressed by mm. ASP represents aspherical surface, and AP represents aperture stop.

The image forming optical system of the present invention can be constituted as follows.

In the image forming optical system of the present invention, a flare stop can be arranged in addition to a brightness aperture stop in order to cut unnecessary light (a ghost flare). Here, a flare stop can be arranged at any of positions at an object side of the front group having negative refracting power, between each lenses which constitute the front group having negative refracting power, between the front group having negative refracting power and the rear groups having positive refracting power, between each lenses which constitute the rear group having positive refracting power, or between the rear group having positive refracting power and image plane. The flare stop can be constituted by using a frame component, or another component. Further, the flare stop can be constituted by printing or painting directly, or by using printed or painted seal onto an optical component. As to shape of the flare stop, any kind of shapes can be used as

Surface data:

| Surface number | Radius of curvature R | Surface (air) interval D | Refraction index Nd | Abbe's number νd |
|---|---|---|---|---|
| 1 (ASP) | −13.988 | 2.10 | 1.85135 | 40.10 |
| 2 (ASP) | 5.820 | 5.33 | | |
| 3 (ASP) | −5.133 | 3.29 | 1.52542 | 55.78 |
| 4 (ASP) | −5.712 | 0.11 | | |
| 5 | 7.840 | 1.92 | 1.92286 | 18.90 |
| 6 | 17.752 | 4.47 | | |
| 7 (AP) | ∞ | 0.66 | | |
| 8 (ASP) | −18.394 | 1.41 | 1.52542 | 55.78 |
| 9 | −21.734 | 0.54 | | |
| 10 (ASP) | 2.745 | 2.20 | 1.52542 | 55.78 |
| 11 (ASP) | −2.653 | | | |

Aspherical surface data:

| Surface number | Radius of curvature R | Conic coefficient K | $A_4$ | $A_6$ | $A_8$ | $A_{10}$ |
|---|---|---|---|---|---|---|
| 1 | −13.988 | −66.460 | 2.00933e−04 | −6.24464e−07 | −6.97220e−10 | |
| 2 | 5.820 | 0.000 | −8.51403e−04 | 1.43123e−05 | −1.89045e−07 | |
| 3 | −5.133 | −1.419 | −6.13369e−04 | −2.14587e−06 | 2.01273e−08 | 2.72864e−09 |
| 4 | −5.712 | −1.014 | −2.03964e−04 | −1.35824e−07 | 1.90642e−08 | −2.77960e−10 |
| 8 | −18.394 | 0.000 | −8.55590e−02 | 7.06453e−02 | −1.79960e−02 | |
| 9 | −21.734 | 0.000 | −8.47649e−02 | 1.43057e−02 | 5.07921e−04 | |
| 10 | 2.745 | 0.000 | −4.05666e−02 | 7.63764e−03 | −7.12255e−04 | |
| 11 | −2.653 | 0.000 | 4.77247e−02 | −2.98474e−03 | 1.18090e−04 | |

Various data:

| | |
|---|---|
| Focal length of the whole system: | 1.04 mm |
| F number: | 2.80 |
| Half-angle of view: | 65.00° |
| Image height: | 2.25 mm |
| Total length of lenses: | 24.00 mm |
| Back focus: | 1.97 mm |

Data concerning the condition mentioned above:

| | |
|---|---|
| Condition (1): | $1.0 < |f_{G1}|/F_A < 10$: 5.9 |
| Condition (2): | $1.0 < f_{G2}/F_A < 10$: 4.7 |
| Condition (3): | $1.7 < n_1 < 2.2$: 1.851 |
| Condition (4): | $0.2 < |f_{G1F}|/f_{G2F} < 0.5$: 0.331 | shown below, such as circular form, ellipse form, rectangle, polygon, shape surrounded with a function curve. Furthermore, in the flare stop, it may be constituted so as to cut harmful luminous flux, but also luminous flux such as a coma flare around a screen.

On each of lenses of the image forming optical system of the present invention, a reflection protecting coat can be applied in order to reduce a ghost and/or a flare. Further, as a reflection protecting coat applied for reducing the ghost and/or the flare effectively, it is desirable to use multi-coating. Furthermore, an infrared cut coat can be applied on a lens surface, a cover glass, etc.

In the image forming optical system of the present invention, it can be constituted so that focusing may be performed for focus adjustment. The focusing can be made by moving the whole lens system, or by moving some of lenses.

Furthermore, in the image forming optical system of the present invention, decrease of brightness of an image circumference portion can be reduced by shifting a micro lens of CCD. For example, according to an angle of incidence of the light in each image height, design of the micro lens of CCD can be changed. The decrease of brightness of an image circumference part can be corrected by image processing.

The image forming optical system of the present invention can be used for not only a camera mounted on vehicle, but also a monitoring camera, a digital camera, a digital camcorder, a miniature camera arranged in a cellular phone, a personal computer, etc.

What is claimed is:

1. An image forming optical system comprising,
in order from an object side, a front lens group having negative refracting power, and
a rear lens group having positive refracting power,
wherein
the front group comprises, in order from the object side, a first lens element having the negative refracting power, and a second lens element of a meniscus form having a convex surface directed toward an image side;
wherein
the first lens element has an aspherical surface that is a concave surface directed toward the object side in the vicinity of the optical axis, and negative refracting power at a position on the aspherical surface becomes weak as a distance between the position and the optical axis becomes large; and a surface that is a concave surface directed toward the image side at least in the vicinity of the optical axis; and further
the following conditions (1) and (2) are satisfied:

$$1.0 < |f_{G1}|/F_A < 10 \quad (1)$$

$$1.0 < |f_{G2}/F_A < 10 \quad (2)$$

where $F_A$ is a focal length of the whole optical system, $f_{G1}$ is a focal length of the front group, and $f_{G2}$ is a focal length of the rear group.

2. The image forming optical system according to claim 1, wherein said rear group comprises two or more positive lens elements and an aperture stop; and a lens at the utmost image side in the rear group has aspherical surfaces;
wherein
a surface directed toward the object side is convex at least in the vicinity of the optical axis, and a surface directed toward the image side is convex in the vicinity of the optical axis, and a positive refracting power at a position on the surfaces becomes weak as a distance between the position and the optical axis becomes large.

3. The image forming optical system according to claim 2, wherein the following condition (4) is satisfied:

$$0.2 < |f_{G1F}|/f_{G2F} < 0.5 \quad (4)$$

where $f_{G1F}$ is a focal length of said first lens group, and $f_{G2F}$ is a focal length of the positive lens at the utmost image side in said rear group.

4. The image forming optical system according to claim 1, wherein a surface at the object side of said first lens element is an aspherical surface, and a refracting power at a position on the surface is changed so that the surface may become concave in the vicinity of the optical axis, and it may become convex in the vicinity of the lens perimeter portion as a distance between the position and the optical axis is changed.

5. The image forming optical system according to claim 1, wherein the following condition (3) is satisfied:

$$1.7 < n_1 < 2.2 \quad (3)$$

where $n_1$ is an index of refraction of d line of said first lens.

6. The image forming optical system according to claim 1, wherein a material of said first lens element is glass.

7. An image forming optical system comprising a front lens group having negative refracting power, and a rear lens group having positive refracting power, which are arranged in order from an object side;
wherein
said front group comprises, in order from the object side, a first lens element having negative refracting power, and a second lens element of a meniscus form having a convex surface directed toward an image side,
wherein
the first lens element has an aspherical surface that is a concave surface directed toward the object side in the vicinity of the optical axis, and negative refracting power at a position on the aspherical surface becomes weak as a distance between the position and the optical axis becomes large, and a surface directed toward the image side that is concave at least in the vicinity of the optical axis; and the rear group comprises, in order from the object side, two or more positive lens elements and an aperture stop, and a lens at the utmost image side in the rear group has aspherical surfaces;
wherein
a surface, of the lens at the utmost image side in the rear group, directed toward the object side is convex at least in the vicinity of the optical axis; and a surface, of the lens at the utmost image side in the rear group, directed toward the image side is convex in the vicinity of the optical axis, and a positive refracting power at a position on the surface becomes weak as a distance between the position and the optical axis becomes large.

8. The image forming optical system according to claim 7, wherein a surface at the object side of said first lens element is an aspherical surface, and a refracting power at a position on the surface is changed so that the surface may be concave in the vicinity of the optical axis, and it may be convex in the vicinity of the lens perimeter portion as a distance between the position and the optical axis is changed.

9. The image forming optical system according to claim 7, wherein the following condition (3) is satisfied $$1.7 < n_1 < 2.2 \tag{3}$$

where $n_1$ is an index of refraction of d line of said first lens.

10. The image forming optical system according to claim 7, wherein a material of said first lens element is glass.

11. The image forming optical system according to claim 7, wherein the following condition (4) is satisfied:

$$0.2 < |f_{G1F}|/f_{G2F} < 0.5 \tag{4}$$

where $f_{G1F}$ is a focal length of said first lens group, and $f_{G2F}$ is a focal length of the positive lens at the utmost image side in said rear group.

* * * * *